Feb. 13, 1962 H. KALLHARDT 3,020,983
GOVERNOR FOR TELEPHONE DIALS
Filed Sept. 2, 1958
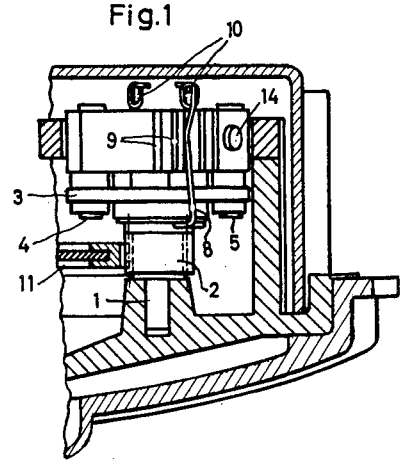
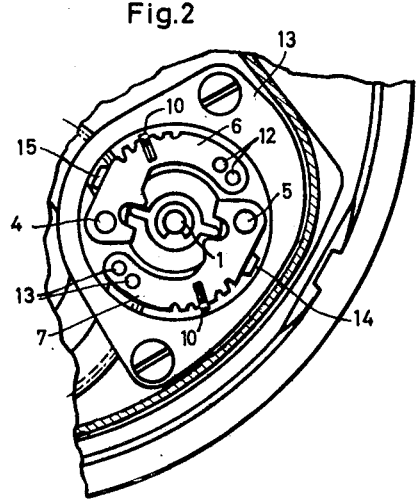
Inventor.
Heinrich Kallhardt.

United States Patent Office 3,020,983
Patented Feb. 13, 1962

3,020,983
GOVERNOR FOR TELEPHONE DIALS
Heinrich Kallhardt, Munich, Germany, assignor to Siemens & Halske Aktiengesellschaft Berlin and Munich, a corporation of Germany
Filed Sept. 2, 1958, Ser. No. 758,521
Claims priority, application Germany Sept. 10, 1957
3 Claims. (Cl. 188—184)

This invention is concerned with a governor for telephone dials. Governors of this kind usually comprise a barlike, rotatably journalled cross member carrying brake shoes which spread more or less apart responsive to rotation of the barlike cross member, depending upon the speed of rotation, overcoming the force of spring means, for sliding brake engagement with a brake cylinder.

The object of the invention is to provide brake shoes for such a governor which may be easily produced and which are adapted to operate reliably without requiring any particular maintenance.

This object is realized by making the brake shoes of synthetic material provided with heavy insert means embedded therein and forming a unit therewith, thus adapting the brake shoes to act in the manner of centrifugally activated weights.

The use of synthetic material, as compared with brake shoes made of metal, results in the desired smiplification in the production.

The heavy insert means is advantageously provided near the free ends of the respective brake shoes, remote from the journal or pivot points thereof, thus providing for the centrifugal force the greatest possible leverage.

Other advantages resulting from the use of synthetic material for the brake shoes reside in the possibility of producing the parts, so far as the weight is concerned which is important for the operation thereof, with greatest accuracy, and to form the usual brake nipples as projections of the brake shoes integral therewith.

It is in the journalling of brake shoes upon pivot pins unavoidable to have material in back of the journals which exerts incident to the braking action a centrifugal force acting opposite to the spreading apart direction of the brake shoes. In the case of brake shoes made of synthetic material, these oppositely acting forces may be practically neglected.

The above mentioned journalling of the brake shoes made of synthetic material results in the further advantage that the journal or pivot points need not be lubricated. The need for lubrication is a drawback in the case of brake shoes made of metal because it must be attended to with meticulous care. If there is an excess of lubricant, parts thereof may during rotation splatter the friction surface of the brake cylinder, thereby reducing the friction coefficient. If there is insufficient lubrication, there is the danger that the brake shoes will not sufficiently spread apart during rotation thereof.

The brake shoes according to the invention are not limited to embodiments involving the journalling thereof on pivot pins. Embodiments may involve knife-edge journalling or spring-journalling of the brake shoes. In case springs are employed for the journalling, one end thereof may advantageously be embedded in the respectively associated brake shoe.

In accordance with an advantageous feature of the invention, a plurality of grooves lying one next to the other may be formed along the arcuate axially extending surfaces of the brake shoes facing the inside wall of the governor cylinder, such grooves extending in the direction of the axis of rotation, and being easily and accurately provided in the synthetic material of the brake shoe incident to the fabrication thereof. These grooves serve for anchoring known restoring springs for the brake shoes, such springs being looped about the governor axis and the free ends thereof being anchored in the grooves. Accordingly, the use of the known springs in conjunction with the grooves formed along the arcuate rims of the brake shoes, which are usually not utilized at all, provides a simple possibility for adjustable placement of the springs and, therefore, regulation of the restoring forces within relatively wide limits, since the grooves are differently spaced from the pivot points of the brake shoes and thus permit variable anchoring of the springs at points of desired levage for the pull exerted by the springs.

The grooves are advantageously formed so that their radial depth in the direction of the governor axis decreases with increasing distance from the pivot axis of the respective brake shoes. Accordingly, in addition to the adjustability of leverage, the force of the springs will be greater with greater leverage.

Known pivotal journalling of brake shoes upon a barlike cross-member involves providing the ends of the respective brake shoes with bores for disposal upon pivot pins positioned upon the barlike cross-members. In such a governor structure, the restoring spring may be looped about the governor axis or shaft underneath the barlike cross member and the free ends of the spring may be bent angularly so as to engage the surfaces of the respective brake shoe, such angularly bent portions of the spring securing the brake shoes against sliding off from the respectively associated pivot pins. The spring accordingly has a dual function, namely, to provide the restoring force for the brake shoes and to secure the brake shoes in position on the respective pivot pins. Individual securing and fastening means for the brake shoes are thus made unnecessary.

It is advantageous to bend the ends of the restoring springs which lie in the grooves so as to form loops for engagement with the brake shoe surface. These loops prevent the sliding off of the brake shoes from the associated pins, in the same manner as the previously mentioned bent portions, and allow moreover adjustment of the restoring spring by hand without requiring the use of pincers or the like.

The brake shoes are provided with the usual nipples for frictional engagement with the brake surface of the governor cylinder incident to the operative rotation thereof. These nipples are usually disposed midway of the spacing between the upper and lower edge of the brake shoes. They lie accordingly in a plane coinciding with the center of gravity of the corresponding brake shoe. The bent off portions of the restoring spring lying in the grooves formed in the brake shoes extend angularly and engage the associated grooves in such a manner that the forces exerted thereby become effective in punctiform manner in the above noted plane. The result is that all forces that are operative incident to the braking or governor action, namely, friction, centrifugal force and restoring force become effective in the same plane, avoiding in the transmission thereof any bending stresses with respect to the pivots of the brake shoes. The brake shoes accordingly will not jam on their pivot pins.

The foregoing and other objects and features of the invention will appear from the description of an embodiment which will be rendered below with reference to the accompanying drawing, wherein:

FIG. 1 is a partial sectional view of a governor according to the invention; and FIG. 2 is a partial elevational view thereof.

Referring now to the drawing, numeral 3 indicates a cross member disposed for rotation by a pinion 2 driven by a drive wheel 11 meshing therewith. At the opposite ends of the cross member 3 are disposed pivot pins 4 and 5 upon which are journalled arcuate brake shoes 6 and 7. The brake shoes are made of synthetic material and carry near their free ends remote from their pivot points relatively heavy axially extending inserts, for example, lead plugs 12 and 13 which are embedded therein. These inserts may of course receive different form and may be made of different heavy material.

The brake shoes are provided with brake nipples indicated at 14 and 15 which are integral with the synthetic material of the respective brake shoe bodies, forming extensions projecting generally radially therefrom, such nipples sliding in frictional engagement with the inner wall of the governor brake cylinder 16 incident to rotation of the cross member 3. The radial outward spreading of the brake shoes depends upon the speed of rotation of the cross member or carrier and takes place against the pull of a torsion spring 8 which is looped about the governor axis underneath the cross member without engaging such axis, the angularly bent legs of the spring being anchored in grooves 9 formed in the respective brake shoe. The bent legs form angular portions for anchoring in the grooves and, as shown in FIG. 1, engage the grooves only punctiform at points lying in the plane of the previously mentioned brake nipples 14 and 15. The free ends of the spring are bent upon themselves to form ears 10 which engage the associated brake shoes at the upper side thereof.

The invention is not limited to details of the illustrated example. Changes and modifications are, accordingly, possible, within the scope and spirit of the appended claims which define what is believed to be new and desired to have protected by Letters Patent.

I claim:

1. A governor for controlling the operation of a telephone dial and the like, comprising a brake cylinder, a carrier member rotatably disposed within said cylinder, means for rotating said carrier member, arcuately shaped brake shoes of synthetic material, a pivot pin carried by said carrier member for each shoe, each of the latter having a bore therein adjacent one end thereof of a size to receive such a pivot pin with the synthetic material comprising said shoe forming bearing means on which the shoe may pivot, brake nipples formed integrally with said shoes from the synthetic material thereof for frictional brake engagement with the inner wall of said brake cylinder, each brake shoe having a weight embedded therein adjacent the free end thereof remote from pivotal axis thereof, said brake shoes spreading responsive to rotation of said carrier member angularly radially outwardly to effect engagement of said brake nipples with the inner wall of said brake cylinder, said brake shoes being provided with a plurality of grooves formed in the walls thereof which face the inner wall of said brake cylinder, and restoring spring means looped about the governor axis and having legs anchored in said grooves, the depth of said grooves decreasing with increasing distance from the pivotal axes of said brake shoes.

2. A governor according to claim 1, wherein the legs of said restoring spring means are angularly bent, with the corresponding bends lying punctiform in said grooves in a plane corresponding to the plane of said brake nipples.

3. A governor according to claim 2, wherein the legs of said spring means are angularly bent at the free ends thereof to form earlike portions for engagement with the respective brake shoes.

References Cited in the file of this patent

UNITED STATES PATENTS

| | | |
|---|---|---|
| 1,600,346 | MacMurchy | Sept. 21, 1926 |
| 2,270,460 | Mehan | Jan. 20, 1942 |
| 2,685,946 | Pferd et al. | Aug. 10, 1954 |
| 2,829,754 | Norcross | Apr. 8, 1958 |

FOREIGN PATENTS

| | | |
|---|---|---|
| 1,136,376 | France | Dec. 29, 1956 |
| 24,969 | Norway | Aug. 31, 1914 |